US008854644B2

(12) United States Patent
Chiba

(10) Patent No.: US 8,854,644 B2
(45) Date of Patent: Oct. 7, 2014

(54) INSTRUCTION ACCEPTING SYSTEM FOR CONTACTING ONE OR MORE INSTRUCTION DEVICES ON DISPLAY DEVICE AND VALIDATE IDENTIFICATION INFORMATION TO PROCESS IMAGES

(75) Inventor: Kunihisa Chiba, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/475,970

(22) Filed: May 19, 2012

(65) Prior Publication Data

US 2012/0293821 A1 Nov. 22, 2012

(30) Foreign Application Priority Data

May 20, 2011 (JP) .................................. 2011-114040

(51) Int. Cl.
G06F 3/12 (2006.01)
G06K 15/00 (2006.01)
H04N 1/00 (2006.01)
G06F 21/43 (2013.01)
H04N 1/44 (2006.01)
G06F 21/60 (2013.01)
H04N 1/32 (2006.01)

(52) U.S. Cl.
CPC ............ *G06F 21/43* (2013.01); *H04N 1/00474* (2013.01); *H04N 2201/0094* (2013.01); *H04N 2201/3278* (2013.01); *H04N 2201/3274* (2013.01); *H04N 1/00962* (2013.01); *H04N 1/4426* (2013.01); *H04N 2201/3205* (2013.01); *H04N 1/4433* (2013.01); *G06F 21/608* (2013.01); *H04N 2201/3222* (2013.01); *H04N 1/32122* (2013.01); *H04N 1/00411* (2013.01); *H04N 1/00392* (2013.01)
USPC .......................... 358/1.13; 358/1.16; 358/1.18

(58) Field of Classification Search
CPC .............. H04N 2201/0093; H04N 2201/0094; H04N 2201/0017; H04N 2201/3202; H04N 2201/3204; H04N 2201/3216; H04N 2201/3218; H04N 2201/3221; H04N 2201/3274; H04N 2201/3278; H04N 1/00209; H04N 1/00216; H04N 1/00244; H04N 1/0041
See application file for complete search history.

(56) References Cited

U.S. PATENT DOCUMENTS

| 2007/0101153 | A1 | 5/2007 | Kawaji |
| 2008/0168542 | A1 * | 7/2008 | Sato ................................. 726/5 |
| 2008/0180714 | A1 | 7/2008 | Ishikawa |
| 2010/0265532 | A1 | 10/2010 | Katahira |
| 2010/0277763 | A1 | 11/2010 | Aoyama et al. |

FOREIGN PATENT DOCUMENTS

| CN | 101877754 A | 11/2010 |
| JP | 2007-122384 A | 5/2007 |

(Continued)

*Primary Examiner* — Benny Q Tieu
*Assistant Examiner* — Haris Sabah
(74) *Attorney, Agent, or Firm* — Edwards Wildman Palmer LLP; David G. Conlin; Steven M. Jensen

(57) ABSTRACT

Between a digital multi-function peripheral for processing data, and one or a plurality of memory devices for giving an instruction for the digital multi-function peripheral to process data, when the memory device(s) contacts a display surface of a display section of the digital multi-function peripheral, the digital multi-function peripheral accepts a first instruction concerning authentication and a second instruction concerning processing of the data based on a contact position, in this case, acquires first identification data stored in the memory device(s) concerning the first instruction and second identification data stored in the memory device(s) concerning the second instruction, and when the first identification data and the second identification data do not coincide with each other, invalidates the accepted second instruction.

4 Claims, 10 Drawing Sheets

(56) References Cited

FOREIGN PATENT DOCUMENTS

| JP | 2007-316729 | A | 12/2007 |
| JP | 2008-187495 | A | 8/2008 |
| JP | 2010-252033 | | 11/2010 |
| JP | 2010-262454 | A | 11/2010 |

* cited by examiner

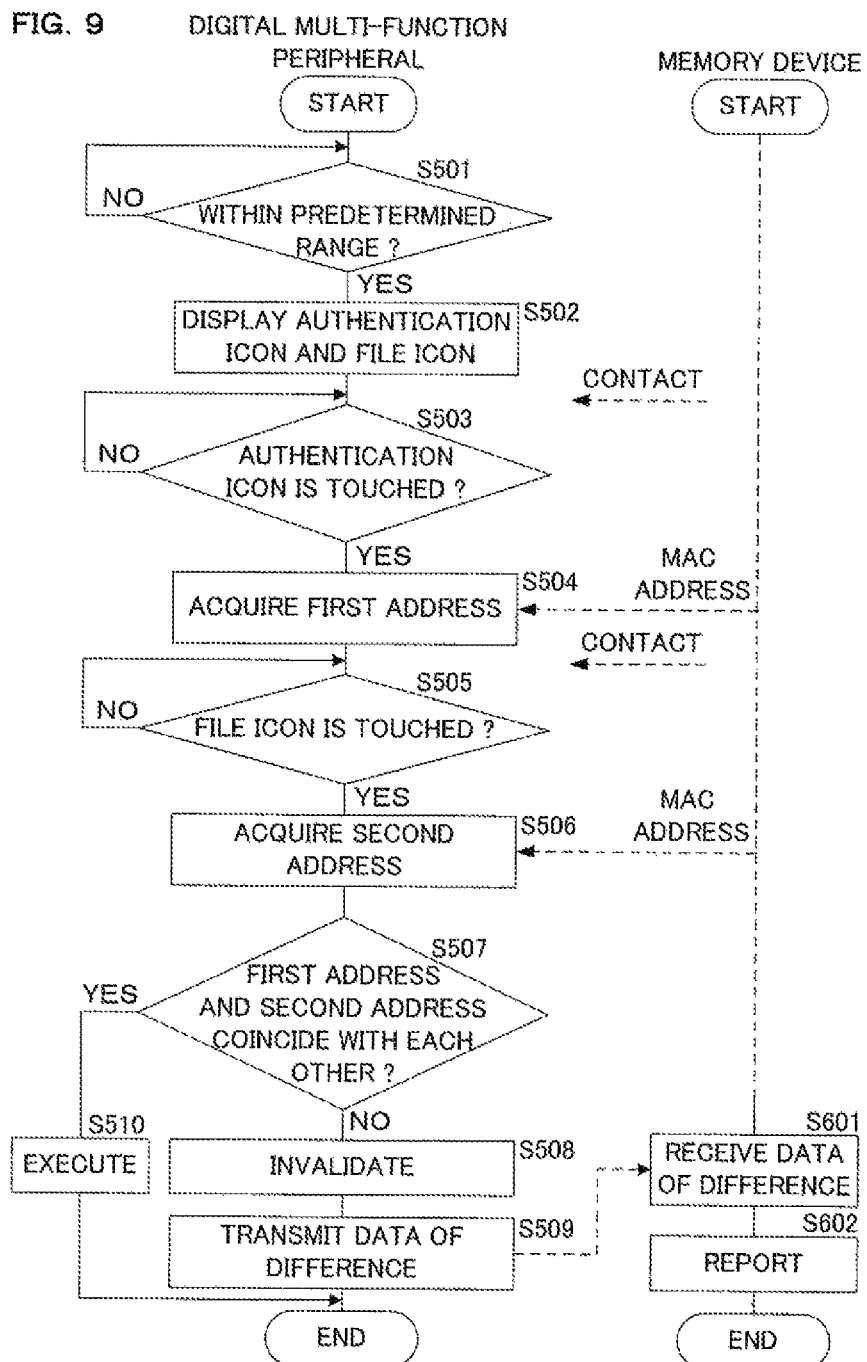

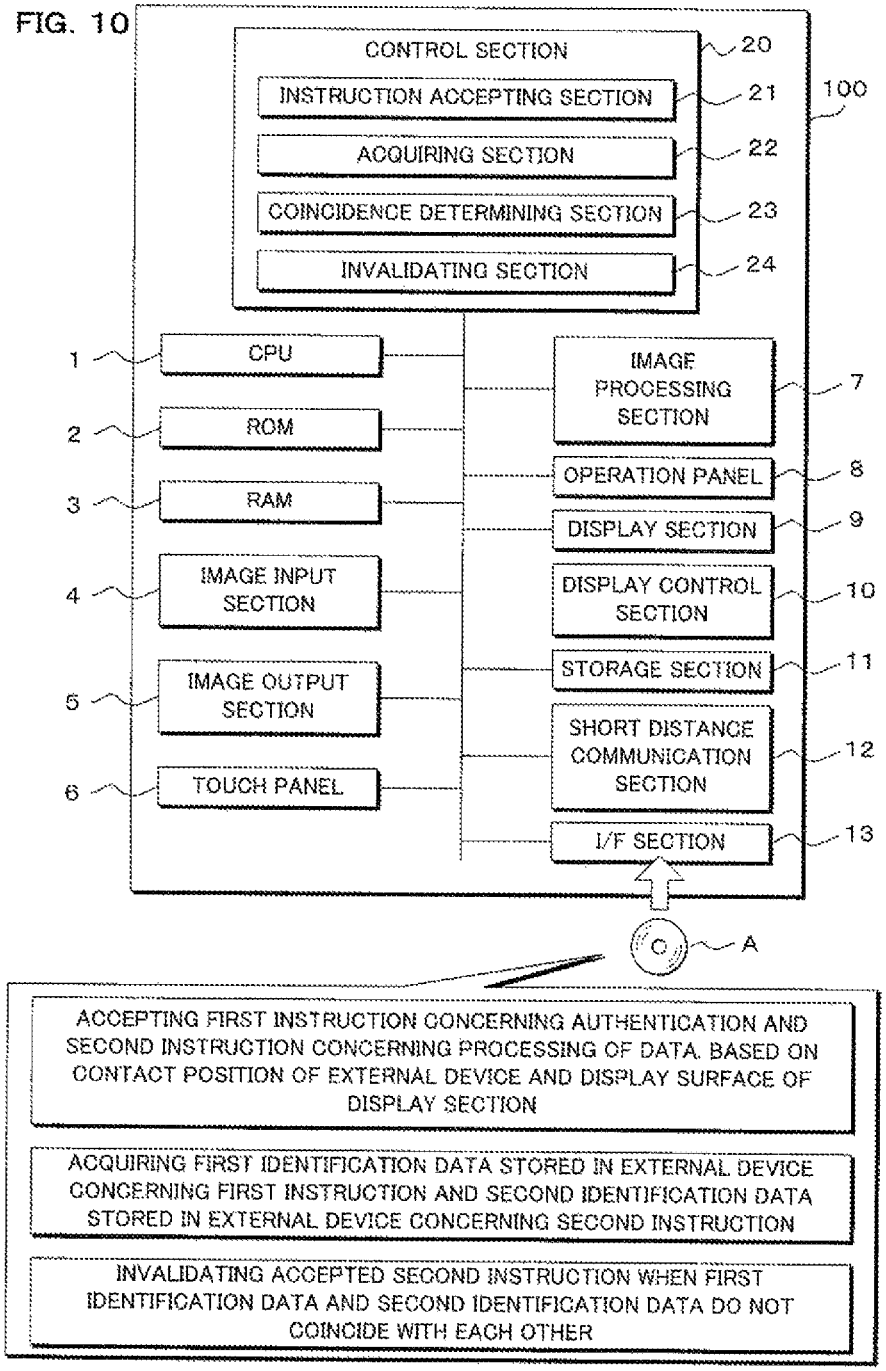

INSTRUCTION ACCEPTING SYSTEM FOR CONTACTING ONE OR MORE INSTRUCTION DEVICES ON DISPLAY DEVICE AND VALIDATE IDENTIFICATION INFORMATION TO PROCESS IMAGES

CROSS-REFERENCE TO RELATED APPLICATIONS

This non-provisional application claims priority under 35 U.S.C. §119(a) on Patent Application No. 2011-114040 filed in Japan on May 20, 2011, the entire contents of which are hereby incorporated by reference.

BACKGROUND

1. Technical Field

The present invention relates to an instruction accepting system, an information processing apparatus, and an instruction accepting method, regarding an instruction acceptance between the information processing apparatus and one or a plurality of instruction devices which give an instruction for the information processing apparatus to process data.

2. Description of Related art

Conventionally, a multi-function peripheral to which a memory device such as a USB memory can be connected, is equipped with a so-called "scan to memory" function in which an image is read by a scanner to create image data and the created image data is stored in the memory device (for example, refer to Japanese Patent Application Laid-Open No. 2008-187495).

When the "scan to memory" function is executed, a user needs to operate an operation panel including a touch panel, for example, and give an instruction to read an image of a document so as to create image data and to send the created image data to the connected memory device.

SUMMARY

However, in the above-described function of the conventional multi-function peripheral, there is a risk that the other person may acquire data concerning such an operation without permission and may abuse it in a case where a user leaves the multi-function peripheral in the middle of the operation or in a case where a user has forgotten logoff, or the like. The invention disclosed in Japanese Patent Application Laid-Open No. 2008-187495 cannot solve such a problem.

The present invention has been made with the aim of solving the above problems, and it is an object of the invention to provide an instruction accepting system, an information processing apparatus, and an instruction accepting method, in which between the information processing apparatus for processing data and one or a plurality of instruction devices for giving an instruction for the information processing apparatus to process data, when the instruction device(s) contacts a display surface of a display section of the information processing apparatus, the information processing apparatus accepts a first instruction concerning authentication and a second instruction concerning processing of the data based on a contact position, in this case, acquires first identification data stored in the instruction device(s) concerning the first instruction and second identification data stored in the instruction device(s) concerning the second instruction, and when the first identification data and the second identification data do not coincide with each other, invalidates the accepted second instruction, and thereby as described above, allowing for the prevention of acquisition of data without permission by the other person that may be caused in a case where a user leaves the apparatus in the middle of the operation or in a case where the user has forgotten logoff or the like.

The instruction accepting system according to the present invention is an instruction accepting system comprising an information processing apparatus for processing data, and one or a plurality of instruction devices for giving an instruction for processing data to the information processing apparatus, wherein the instruction device(s) comprises a storage section for storing identification data of the instruction device(s) itself, the information processing apparatus comprises: a display section including a display surface for contacting the instruction device(s); an instruction accepting section for accepting a first instruction concerning authentication and a second instruction concerning processing of the data, based on a contact position of the instruction device(s) and the display surface of the display section; an acquiring section for acquiring first identification data stored in the instruction device(s) concerning the first instruction, and second identification data stored in the instruction device(s) concerning the second instruction; and an invalidating section for invalidating the second instruction accepted by the instruction accepting section when the first identification data and the second identification data do not coincide with each other.

The instruction accepting system according to the present invention is characterized in that the information processing apparatus further comprises an existence determining section for determining whether or not the instruction device(s) is in a predetermined range, when the existence determining section determines that the instruction device(s) is in the predetermined range, the display section displays images concerning the first instruction and the second instruction, respectively, and the instruction accepting section accepts the first instruction or the second instruction based on contact of the instruction device(s) and the image.

In the present invention, on the information processing apparatus side, the instruction accepting section accepts a first instruction concerning authentication and a second instruction concerning processing of the data, based on a contact position of the instruction device(s) and the display surface of the display section. In this case, the acquiring section acquires first identification data stored in the instruction device(s) concerning the first instruction, and second identification data stored in the instruction device(s) concerning the second instruction, and when the first identification data and the second identification data do not coincide with each other, the invalidating section invalidates the second instruction accepted by the instruction accepting section.

In the present invention, on the information processing apparatus side, when the existence determining section determines that the instruction device(s) is in a predetermined range, the display section displays images representing the first instruction and the second instruction, and the instruction accepting section accepts the first instruction or the second instruction based on contact of the instruction device(s) and the image.

The information processing apparatus according to the present invention is an information processing apparatus for accepting an instruction concerning processing of data from one or a plurality of external devices storing identification data of the external device(s) itself, and processing the data, comprising: a display section including a display surface for contacting the external device(s); an instruction accepting section for accepting a first instruction concerning authentication and a second instruction concerning processing of the data, based on a contact position of the external device(s) and the display surface of the display section; an acquiring section for acquiring first identification data stored in the external device(s) concerning the first instruction, and second identification data stored in the external device(s) concerning the second instruction; and an invalidating section for invalidating the second instruction accepted by the instruction accepting section when the first identification data and the second identification data do not coincide with each other.

In the present invention, the instruction accepting section accepts a first instruction concerning authentication and a second instruction concerning processing of the data, based on a contact position of the external device(s) and the display surface of the display section. In this case, the acquiring section acquires first identification data stored in the external device(s) concerning the first instruction and second identification data stored in the external device(s) concerning the second instruction, and when the first identification data and the second identification data do not coincide with each other, the invalidating section invalidates the second instruction accepted by the instruction accepting section.

The instruction accepting method according to the present invention is an instruction accepting method using an information processing apparatus comprising a display section including a display surface for contacting one or a plurality of external devices storing identification data of the external device(s) itself, the information processing apparatus for accepting an instruction concerning processing of data from the external device(s) and processing the data comprising: an instruction accepting step of accepting a first instruction concerning authentication and a second instruction concerning processing of the data, based on a contact position of the external device(s) and the display surface of the display section; a step of acquiring first identification data stored in the external device(s) concerning the first instruction, and second identification data stored in the external device(s) concerning the second instruction; and a step of invalidating a second instruction accepted at the instruction accepting step when the first identification data and the second identification data do not coincide with each other.

In the present invention, a first instruction concerning authentication and a second instruction concerning processing of the data are accepted, based on a contact position of the external device(s) and the display surface of the display section. In this case, first identification data stored in the external device(s) concerning the first instruction and second identification data stored in the external device(s) concerning the second instruction are acquired, and when the first identification data and the second identification data do not coincide with each other, the accepted second instruction is invalidated.

According to the present invention, when first identification data of the instruction device(s) concerning the first instruction and second identification data of the instruction device(s) concerning the second instruction do not coincide with each other, which may be caused in a case where an unfair operation by the other person is performed in a state where a user leaves the apparatus in the middle of the operation or in a state where the logoff is not completed, for example, the accepted second instruction is invalidated, and thereby acquisition of data without permission and improper use by the other person can be prevented beforehand.

The above and further objects and features will more fully be apparent from the following detailed description with accompanying drawings.

BRIEF DESCRIPTION OF THE SEVERAL VIEWS OF THE DRAWINGS

FIG. 9 is a flow chart explaining an instruction acceptance between the digital multi-function peripheral and the memory device in Example 2 of Embodiment 2 of the present invention.

FIG. 10 is a functional block diagram showing an essential configuration of a digital multi-function peripheral according to Embodiment 3 of the present invention.

DETAILED DESCRIPTION

Hereinafter, an instruction accepting system according to Embodiments of the present invention will be explained in detail based on the drawings, while applying an information processing apparatus and an instruction device according to Embodiments of the present invention to a digital multi-function peripheral and a memory device, respectively.

Embodiment 1

Figure 1:
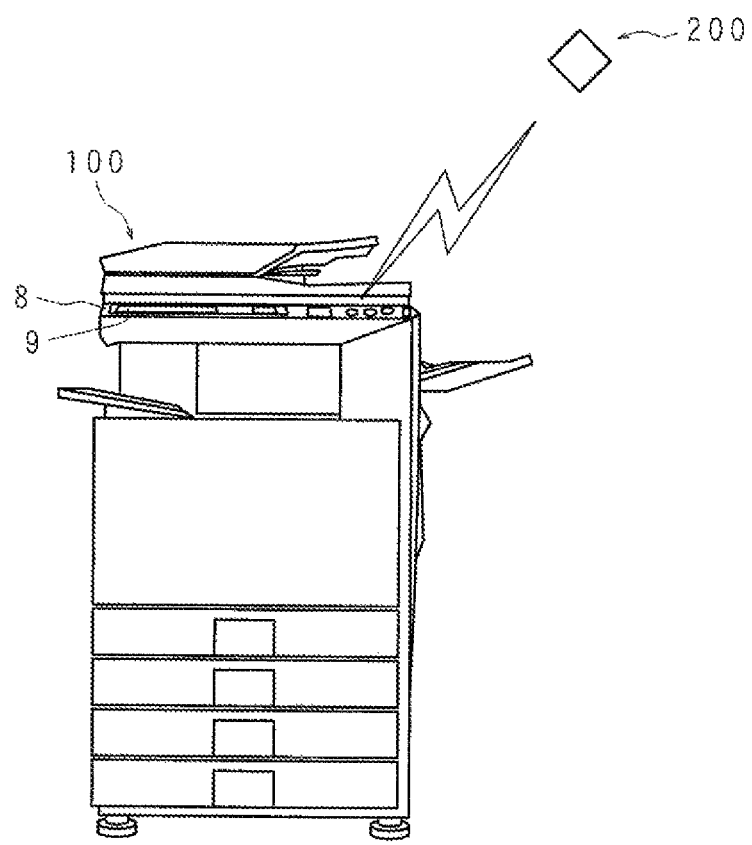
FIG. 1 is a schematic diagram showing an instruction accepting system according to Embodiment 1 of the present invention.
Figure 2:
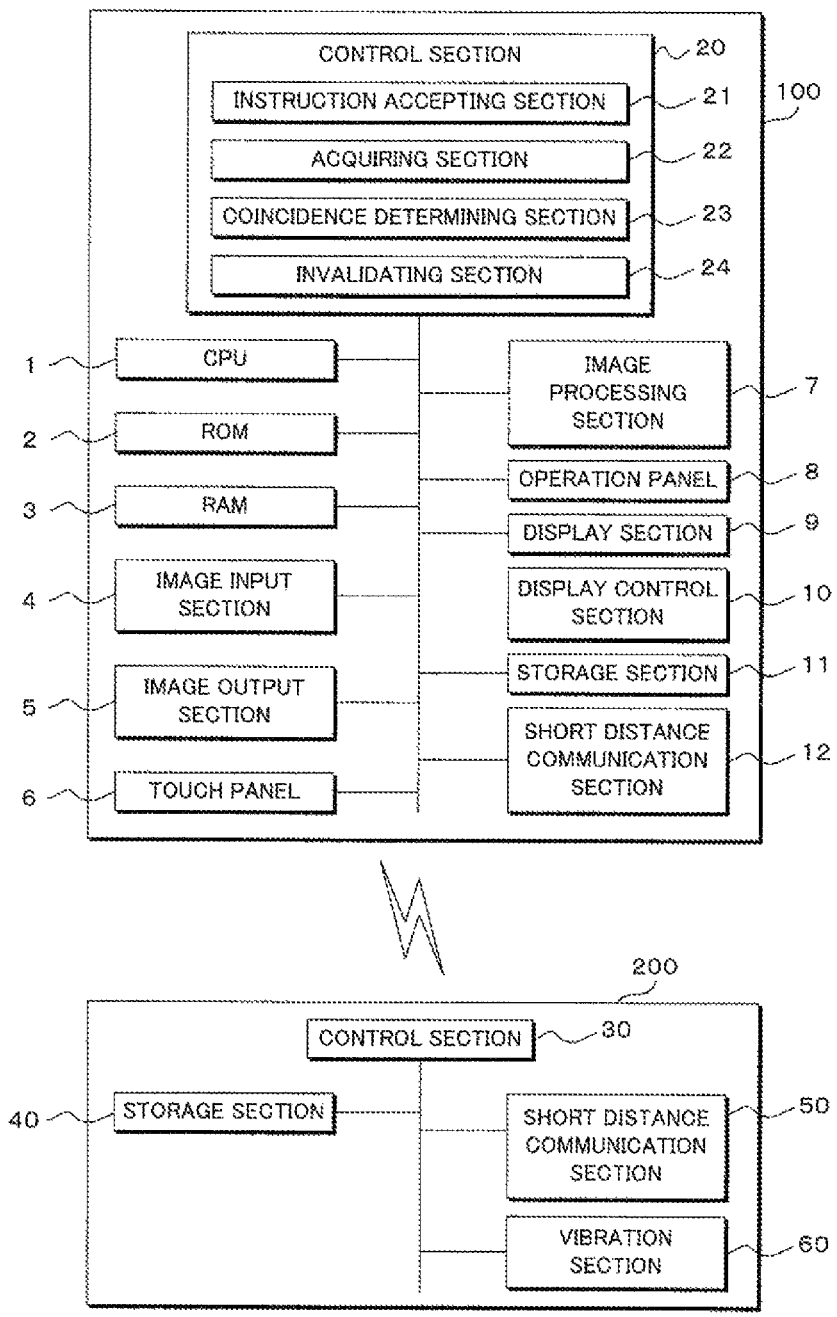
FIG. 2 is a functional block diagram showing an essential configuration of the instruction accepting system according to Embodiment 1 of the present invention.

FIG. 1 is a schematic diagram showing an instruction accepting system according to Embodiment 1 of the present invention, and FIG. 2 is a functional block diagram showing an essential configuration of the instruction accepting system according to Embodiment 1 of the present invention. The instruction accepting system according to Embodiment 1 comprises a digital multi-function peripheral 100 (information processing apparatus), and one or a plurality of memory devices including a memory device 200 (instruction device).

The digital multi-function peripheral 100 comprises hardware devices, such as a control section 20, a CPU 1, a ROM 2, a RAM 3, an image input section 4, an image output section 5, a touch panel 6, an image processing section 7, an operation panel 8, a display section 9, a display control section 10, a storage section 11, and a short distance communication section 12 (transmitting section) and the like, and the whole hardware devices are configured as the digital multi-function peripheral 100.

The ROM 2 stores basically fixed data etc. of various kinds of control programs and parameters for operations in advance, and the RAM 3 is capable of storing data temporarily and allows the data to be read regardless of the order and place they are stored. The RAM 3 stores, for example, a program read from the ROM 2, various kinds of data generated by the execution of the program and parameters varying appropriately during the execution, and the like.

The CPU 1 loads on the RAM 3 the control program stored in the ROM 2 in advance and executes it, to control the above-mentioned various hardware devices via a bus (not shown), and operates the whole apparatus as the digital multifunction peripheral 100 of the present invention.

The image input section 4 is reading means for reading an image of a document optically, and includes a light source for irradiating a document for reading with light and an image sensor such as a CCD (Charge Coupled Device) for example, and the like. The image input section 4 focuses an optical image reflected from a document set at a predetermined read position onto the image sensor, and outputs an RGB (R: Red, G: Green, B: Blue) analog electrical signal. The analog electrical signal outputted by the image input section 4 is inputted to the image processing section 7.

The image output section 5 forms an image on a sheet, such as paper and an OHP film, based on image data outputted from the image processing section 7. Therefore, the image output section 5 includes: a photosensitive drum; a charger for charging the photosensitive drum to a predetermined potential; a laser writer for emitting a laser beam according to image data received from an external device to generate an electrostatic latent image on the photosensitive drum; a developing unit for supplying a toner to the electrostatic latent image formed on a surface of the photosensitive drum to visualize the image; and a transfer unit (not shown) for transferring the toner image formed on the surface of the photosensitive drum to a sheet, and the like, and the image output section 5 forms the image desired by a user on the sheet by an electro-photographic method. Note that an image may be formed by an inkjet method, a heat transfer method or a sublimation method, or the like in addition to the electro-photographic method using the laser writer.

The touch panel 6 is provided so as to cover a display surface of the display section 9. The touch panel 6 detects a contact with the display surface of the display section 9 and identifies a position of the contact, thereby it can accept a predetermined instruction from a user.

In detail, the touch panel 6 detects change of pressure according to a touch operation by a user's fingertip, etc. or according to contact with the memory device 200, or detects an electrical signal according to static electricity, detects coordinates on the display surface of the display section 9 concerning a contact point with the user's fingertip or the memory device 200, and generates a signal for identifying the coordinates. The signal for identifying a position (coordinates) concerning the contact detected by the touch panel 6 is sent to the CPU 1 and the control section 20.

For example, the control section 20 acquires the signal (coordinates) from the touch panel 6, and can recognize that an icon of the position corresponding to the coordinates has been operated, among an authentication icon or a file icon displayed on the display section 9 as described below.

That is, when the control section 20 recognizes that the authentication icon has been contacted and operated, the control section 20 accepts an instruction (first instruction) to start authentication. Alternatively, when the control section 20 recognizes that the file icon has been contacted and operated, the control section 20 accepts an instruction (second instruction) to transmit or copy data corresponding to a file icon concerning the contact (hereinafter referred to as corresponding data) to a predetermined memory device (for example, memory device 200).

For example, the CPU 1 determines whether the contact is a touch operation, a flick operation or a drug operation based on the signal from the touch panel 6, and the corresponding data is transmitted or copied to the memory device 200 based on a determination result of the CPU 1. For example, when the CPU 1 determines that the contact is the touch operation, a later-described instruction accepting section 21 of the control section 20 accepts as an instruction to transmit the corresponding data concerning the contact to the memory device 200. On the other hand, when the CPU 1 determines that the contact is the flick operation or the drug operation, i.e., when the CPU 1 determines that the contact is not the touch operation, the instruction accepting section 21 accepts an instruction to copy the corresponding data concerning the contact to the memory device 200.

The image processing section 7 generates image data of a digital format based on an analog electrical signal inputted through the image input section 4, for example, performs a process according to a type of an image, and then generates image data for output. The generated image data is outputted to the image output section 5 or the short distance communication section 12.

The operation panel 8 is provided with various buttons for accepting an instruction of a user, an enter key for accepting determination of the instruction, a numeric keypad, and the like.

The display section 9 includes an LCD panel or an EL (Electroluminescence) panel, for example, and displays information to be reported to a user, such as the file icon and the authentication icon and the like. The touch panel 6 is provided so as to cover the display surface of the display section 9.

The display control section 10 includes a processor like a DSP (Digital Signal Processor), and controls an image displaying to the display section 9. The display control section 10 displays on the display section 9 a file icon (image) representing a file of image data read by the image input section 4 or a file of data stored in the storage section 11, or an authentication icon (image) for accepting an instruction of authentication.

The storage section 11 includes a nonvolatile storage medium, such as a flash memory, an EEPROM, an HDD, a MRAM (magneto-resistance memory), a FeRAM (ferroelectric memory) or an OUM, for example. The storage section 11 stores image data inputted through (or read by) the image input section 4, for example, for each predetermined file name. Moreover, the storage section 11 stores an ID (identification data) of a user who is given permission of the use of the digital multi-function peripheral 100 and/or a MAC address (identification data) of a memory device which is possessed by the user.

The short distance communication section 12 is communication means capable of transmitting and receiving data in a range of several centimeters to several meters. The short distance communication section 12 is, for example, a Bluetooth (registered trademark)-enabled device, an IEEE802.11-enabled device, a communication mode of a non-contact method (RFID (Radio Frequency Identification) system)-enabled device, or a TransferJet (registered trademark)-enabled device.

The following description explains the case in which the short distance communication section 12 is the RFID-enabled device as an example.

For example, when the short distance communication section 12 approaches a later-described short distance communication section 50 of the memory device 200 to an extent that they can communicate with each other, the short distance communication section 12 is configured so as to establish communication with the short distance communication section 50 of the memory device 200.

In detail, the short distance communication section 12 of the digital multi-function peripheral 100 functions as a so-called contact/non-contact IC card, the short distance communication section 50 of the memory device 200 function as a so-called reader/writer, and they are configured so as to employ a so-called electrostatic coupling method or a so-called electromagnetic coupling method. In this case, the reader/writer (short distance communication section 50) always sends an activation signal (electromagnetic wave). When the contact/non-contact IC card (short distance communication section 12) and the reader/writer (short distance communication section 50) approach each other to the extent that they can communicate with each other (several millimeters to several centimeters), the contact/non-contact IC card (short distance communication section 12) receives an electromagnetic wave sent from the reader/writer (short distance communication section 50). When the contact/non-contact IC card (short distance communication section 12) receives the electromagnetic wave, it rectifies a carrier wave of the electromagnetic wave to generate DC power supply, and thereby an internal circuit thereof is driven. Then, the contact/non-contact IC card (short distance communication section 12) performs amplitude modulation, and sends a reply signal according to the activation signal to the reader/writer (short distance communication section 50). Thereby, communication between the short distance communication section 12 and the short distance communication section 50 is established.

The control section 20 controls the above-described hardware devices, and processes an instruction acceptance concerning the instruction accepting system of the present invention. The control section 20 includes the instruction accepting section 21, an acquiring section 22, a coincidence determining section 23, and an invalidating section 24.

When the authentication icon is contacted and operated, the instruction accepting section 21 accepts an instruction to start authentication of the memory device 200 concerning the contact (hereinafter referred to as first instruction), based on a signal from the touch panel 6. Alternatively, when the file icon is contacted and operated, the instruction accepting section 21 accepts an instruction to transmit or copy corresponding data of the file icon concerning the contact to a predetermined memory device (hereinafter referred to as second instruction).

The acquiring section 22 acquires a MAC address (identification data) from a memory device concerning an icon which is contacted and operated for identifying the memory device. In detail, when the authentication icon is contacted and operated, the acquiring section 22 acquires a MAC address of a memory device in contact with the authentication icon (hereinafter referred to as first address) from the memory device through the short distance communication section 12. Alternatively, when the file icon is contacted and operated, the acquiring section 22 acquires a MAC address of a memory device in contact with the file icon (hereinafter referred to as second address) from the memory device through short distance communication section 12.

The coincidence determining section 23 determines whether or not a first address (first identification data) acquired by the acquiring section 22 and a second address (second identification data) coincide with each other.

The invalidating section 24 invalidates a second instruction accepted by the instruction accepting section 21, based on a determination result of the coincidence determining section 23. In detail, since there is a high risk that a user who gives an instruction to process data is not the user who gives an instruction to authenticate a memory device when the coincidence determining section 23 determines that a first address and a second address do not coincide with each other, the invalidating section 24 invalidates a second instruction accepted by the instruction accepting section 21.

On the other hand, the memory device 200 is in a rectangular parallelepiped shape having a size capable of being held by a hand of a user, and is provided with a control section 30 including a CPU (not shown) for controlling the whole device, a storage section 40, a short distance communication section 50 (receiving section), and a vibration section 60 (reporting section).

The control section 30 controls the above-described hardware devices, and operates them as the memory device 200 of the instruction accepting system of the present invention.

The storage section 40 is a flash memory, for example, and stores data received from the digital multi-function peripheral 100 through the short distance communication section 50, in association with a predetermined file name. The storage section 40 stores a MAC address of the own memory device.

The short distance communication section 50 is communication means capable of transmitting and receiving data in a range of several centimeters to several meters, and responds to the short distance communication section 12 of the digital multi-function peripheral 100. Similarly to the short distance communication section 12, the short distance communication section 50 is, for example, a Bluetooth (registered trademark)-enabled device, an IEEE802.11-enabled device, a communication mode of a non-contact method (RFID (Radio Frequency Identification) system)-enabled device, or a TransferJet (registered trademark)-enabled device.

The following description explains the case in which the short distance communication section 50 is the RFID-enabled device as an example.

For example, when the short distance communication section 50 approaches the short distance communication section 12 of the digital multi-function peripheral 100 to an extent that they can communicate with each other, the short distance communication section 50 is configured so as to establish communication with the short distance communication section 12 of the digital multi-function peripheral 100, and transmit a MAC address (identification data) of the own memory device to the short distance communication section 12 of the digital multi-function peripheral 100.

The vibration section 60 includes a vibrator for producing a vibration, and vibrates by power-supply from electric source (not shown) to report various events to a user. The vibration by the vibration section 60 has a plurality of patterns, and is controlled by the CPU of the control section 30.

The following description explains an instruction acceptance in the instruction accepting system according to Embodiment 1 of the present invention, while taking an example of an instruction acceptance between the digital multi-function peripheral 100 and the memory device 200.

Example 1

Figure 3:
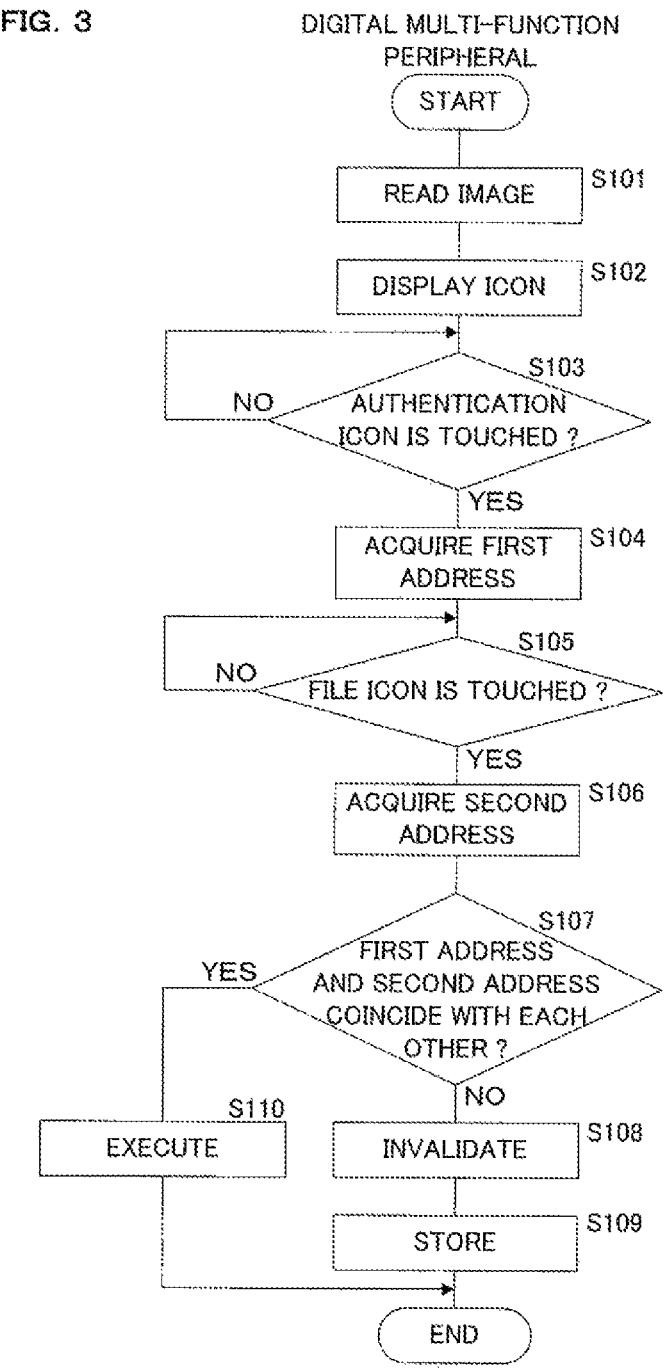
FIG. 3 is a flow chart explaining an instruction acceptance between a digital multi-function peripheral and a memory device in Example 1 of Embodiment 1 of the present invention.

FIG. 3 is a flow chart explaining an instruction acceptance between the digital multi-function peripheral 100 and the memory device 200 in Example 1 of Embodiment 1 of the present invention.

First, a user places a document on a document table of the image input section 4, operates the operation panel 8, and gives an instruction to read the document. The CPU 1 accepts the instruction to read through the operation panel 8, and gives an instruction for the image input section 4 to read an image of the document. The image input section 4 reads the image of the document according to the instruction of the CPU 1 (Step S101). Image data of the image of the document read by the image input section 4 is given a predetermined file name, and is stored in the storage section 11.

Figure 4:
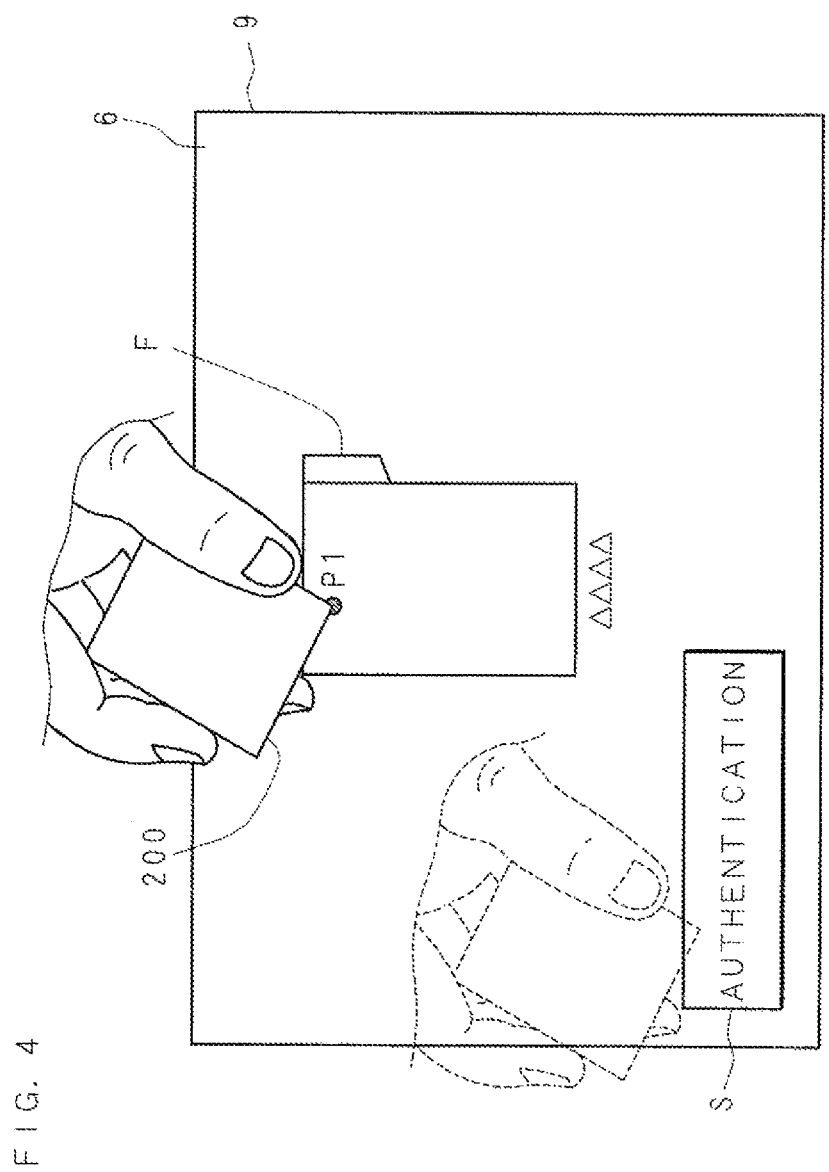
FIG. 4 is an exemplary view showing a display example of a file icon and an authentication icon, and an example of an icon contact operation, in Example 1 of Embodiment 1 of the present invention.

Subsequently, the display control section 10 displays a file icon (image) representing a file of the image data of the document read by the image input section 4 and the authentication icon (image) on the display section 9 (Step S102). FIG. 4 is an exemplary view showing a display example of a file icon F and an authentication icon S, and an example of an icon contact operation, in Example 1 of Embodiment 1 of the present invention.

A user who desires to transmit image data of a document read by the image input section 4 to a memory device 200 first gives an instruction to authenticate the memory device 200 which he/she possesses, and then contacts the file icon F displayed on the display section 9 using the memory device 200. That is, the user holds the memory device 200 in his/her hand and touches the authentication icon S using a predetermined portion of the memory device 200 to give an instruction to authenticate the memory device 200, and then touches the file icon F and gives an instruction to transmit the image data of the document. In this case, the digital multi-function peripheral 100 (short distance communication section 12) and the memory device 200 (short distance communication section 50) are located in a range in which they can communicate with each other.

The CPU 1 determines whether or not the authentication icon S displayed on the display section 9 is touched, by monitoring the touch panel 6, in other words, based on a signal from the touch panel 6 (Step S103).

When the CPU 1 determines that the authentication icon S displayed on the display section 9 is not touched (Step S103: NO), the CPU 1 repeats the determination until the authentication icon S is touched.

Alternatively, when the CPU 1 determines that the authentication icon S displayed on the display section 9 is touched (Step S103: YES), the instruction accepting section 21 accepts the first instruction concerning the authentication icon S.

In this case, the acquiring section 22 acquires a MAC address, i.e., a first address, of a memory device 200 in contact with the authentication icon S from the memory device 200 through the short distance communication section 12, as described above (Step S104). The acquired first address is temporarily stored in the RAM 3.

Note that the present invention is not limited to such a configuration. For example, in a case where a user does not perform a touch operation using a memory device or does not hold the memory device, thereby the communication is not established and the first address is not acquired, the CPU 1 may be configured so as to invalidate a touch of the authentication icon S.

Moreover, the CPU 1 may be configured so as to invalidate an acceptance of the second instruction in a case where the second instruction is accepted before the first instruction is accepted, in other words, in a case where the file icon F is touched before the first instruction is accepted.

Furthermore, the CPU 1 may be configured so as to authenticate whether or not a user corresponding to the acquired first address is the user who is given permission of the use of the own apparatus, based on a memory content stored in the storage section 11.

Subsequently, the CPU 1 determines whether or not the file icon F displayed on the display section 9 is touched, by monitoring the touch panel 6, in other words, based on a signal from the touch panel 6 (Step S105).

When the CPU 1 determines that the file icon F displayed on the display section 9 is not touched (Step S105: NO), it repeats the determination until the file icon F is touched.

Alternatively, when a user touches the file icon F using the memory device 200, thereby the CPU 1 determines that the file icon F displayed on the display section 9 is touched (Step S105: YES), the instruction accepting section 21 accepts the second instruction concerning the file icon F.

In this case, the acquiring section 22 acquires a MAC address, i.e., a second address, of a memory device in contact with the file icon F from the memory device (Step S106). Since the memory device 200 contacts the file icon F, the acquiring section 22 acquires the MAC address of the memory device 200 as the second address through the short distance communication section 12. The acquired second address is temporarily stored in the RAM 3.

Note that the present invention is not limited to such a configuration. For example, the CPU 1 may be configured so as to invalidate a touch of the file icon F in a case where a user does not perform a touch operation using a memory device or does not hold the memory device, thereby the communication is not established and the second address is not acquired.

Subsequently, the coincidence determining section 23 determines whether or not the first address and the second address stored in the RAM 3 coincide with each other, by comparing the first address with the second address (Step S107).

When the coincidence determining section 23 determines that the first address and the second address do not coincide with each other (Step S107: NO), the invalidating section 24 invalidates the second instruction accepted by the instruction accepting section 21 (Step S108).

That is, since there is a high risk of an unfair operation by the other person who does not give an instruction to authenticate a memory device in a case where the first address and the second address do not coincide with each other, the invalidating section 24 invalidates the accepted instruction (second instruction) so as to prevent such an unfair operation from occurring.

Moreover, the CPU 1 causes the storage section 11 to store the second address of the memory device acquired at Step S106 (Step S109). Thereafter, when the instruction accepting section 21 accepts an instruction by a touch of a memory device corresponding to the second address, the invalidating section 24 invalidates the instruction.

Note that the present invention is not limited to such a configuration. For example, the present invention may be configured so as to write data to the effect that an establishment of communication is forbidden to a storage section of a memory device concerning the unfair operation, and refuse establishment of communication between the short distance communication section 12 of the digital multi-function peripheral 100 and a short distance communication section of the memory device. Moreover, the present invention may be configured so as to remove such a refusal of establishment of communication after a predetermined period of time has elapsed.

On the other hand, when the coincidence determining section 23 determines that the first address and the second address coincide with each other (Step S107: YES), the CPU 1 sends image data of a document corresponding to the file icon F to the short distance communication section 12, and gives an instruction for the short distance communication section 12 to transmit the image data to the memory device 200 corresponding to the first address or the second address.

The short distance communication section 12 transmits the image data to the short distance communication section 50 of the memory device 200 according to the instruction of the CPU 1, and thereby the second instruction accepted by the instruction accepting section 21 is executed (Step S110).

Note that the present invention is not limited to such a configuration. It may be configured so that, when not a touch operation but a flick operation or a drag operation, for example, is performed by a user, the instruction accepting section 21 accepts such an operation as an instruction to move copy data of image data of a document corresponding to a file icon F to the memory device 200, and that the short distance communication section 12 transmits the copy data of image data of the document corresponding to the file icon F to the short distance communication section 50 of the memory device 200.

Example 2

Figure 5:
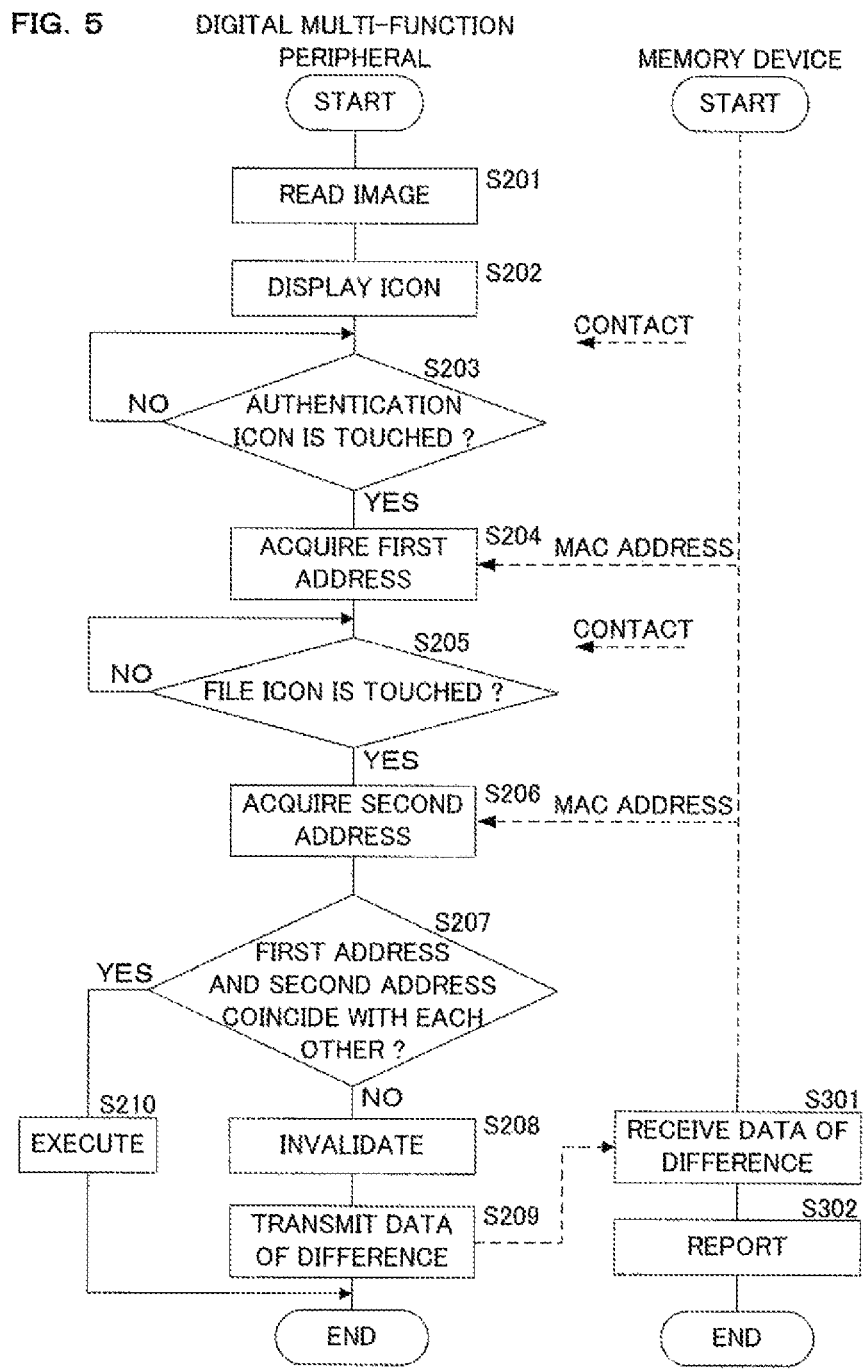
FIG. 5 is a flow chart explaining an instruction acceptance between the digital multi-function peripheral and the memory device in Example 2 of Embodiment 1 of the present invention.

FIG. 5 is a flow chart explaining an instruction acceptance between the digital multi-function peripheral 100 and the memory device 200 in Example 2 of Embodiment 1 of the present invention. For convenience of description, in the following description, a second instruction is an instruction for transmitting data to a memory device.

First, a user places a document onto the document table of the image input section 4, operates the operation panel 8, and gives an instruction to read the document. The CPU 1 accepts the instruction to read through the operation panel 8, and gives an instruction for the image input section 4 to read an image of the document. The image input section 4 reads the image of the document according to the instruction of the CPU 1 (Step S201). Image data of the image of the document read by the image input section 4 is given a predetermined file name, and is stored in the storage section 11.

Subsequently, the display control section 10 displays a file icon (image) representing a file of the image data of the document read by the image input section 4 and the authentication icon (image) on the display section 9 (Step S202) (refer to FIG. 4).

A user who desires to transmit the image data of the document read by the image input section 4 to the memory device 200 holds the memory device 200 in his/her hand, touches the authentication icon S using a predetermined portion of the memory device 200 to give an instruction to authenticate the memory device 200, and then touches the file icon F and gives an instruction to transmit the image data of the document. In this case, the digital multi-function peripheral 100 (short distance communication section 12) and the memory device 200 (short distance communication section 50) are located in a range in which they can communicate with each other.

The CPU 1 determines whether or not the authentication icon S displayed on the display section 9 is touched, by monitoring the touch panel 6, in other words, based on a signal from the touch panel 6 (Step S203). When the CPU 1 determines that the authentication icon S is not touched (Step S203: NO), it repeats the determination until the authentication icon S is touched.

Alternatively, when the CPU 1 determines that the authentication icon S is touched (Step S203: YES), the instruction accepting section 21 accepts the first instruction.

In this case, the acquiring section 22 acquires a MAC address, i.e., a first address, of a memory device 200 in contact with the authentication icon S from the memory device 200 through the short distance communication section 12 (Step S204). The acquired first address is temporarily stored in the RAM 3.

Subsequently, the CPU 1 determines whether or not the file icon F displayed on the display section 9 is touched, by monitoring the touch panel 6, in other words, based on a signal from the touch panel 6 (Step S205). When the CPU 1 determines that the file icon F is not touched (Step S205: NO), it repeats the determination until the file icon F is touched.

Alternatively, when a user touches the file icon F using the memory device 200, thereby the CPU 1 determines that the file icon F displayed on the display section 9 is touched (Step S205: YES), the instruction accepting section 21 accepts the second instruction.

In this case, the acquiring section 22 acquires a MAC address, i.e., a second address, of a memory device in contact with the file icon F from the memory device (Step S206). Since the memory device 200 contacts the file icon F, the acquiring section 22 acquires the MAC address of the memory device 200 as the second address through the short distance communication section 12. The acquired second address is temporarily stored in the RAM 3.

Subsequently, the coincidence determining section 23 determines whether or not the first address and the second address stored in the RAM 3 coincide with each other, by comparing the first address with the second address (Step S207). When the coincidence determining section 23 determines that the first address and the second address do not coincide with each other (Step S207: NO), that is, when a memory device other than the memory device 200 touches the file icon F, the invalidating section 24 invalidates the second instruction accepted by the instruction accepting section 21 (Step S208).

Moreover, the CPU 1 generates data (difference data) the memory device corresponding to the first address and the memory device corresponding to the second address are different from each other, sends it to the short distance communication section 12, and gives an instruction to transmit it to the memory device 200. According to the instruction of the CPU 1, the short distance communication section 12 transmits the difference data to the memory device 200 corresponding to the first address (Step S209).

In this case, the short distance communication section 50 of the memory device 200 receives the difference data (Step S301). The control section 30 causes the vibration section 60 to vibrate at a predetermined pattern, and to report to a user that the memory device corresponding to the first address and the memory device corresponding to the second address are different from each other, in other words, such an operation is performed by the other person (Step S302).

In the above description, although the case in which the vibration section 60 reports to the user using the vibration is explained as an example, the present invention is not limited to this. For example, the present invention may be configured so as to provide an LED, and report by varying a luminescent pattern or a luminescent color.

On the other hand, when the coincidence determining section 23 determines that the first address and the second address coincide with each other (Step S207: YES), the CPU 1 sends the image data of the document corresponding to the file icon F to the short distance communication section 12, and gives an instruction to transmit it to the memory device 200 corresponding to the first address or the second address. The short distance communication section 12 transmits the image data of the document corresponding to the file icon F to the short distance communication section 50 of the memory device 200 according to the instruction of the CPU 1, and thereby the second instruction accepted by the instruction accepting section 21 is executed (Step S210).

Embodiment 2

Figure 6:
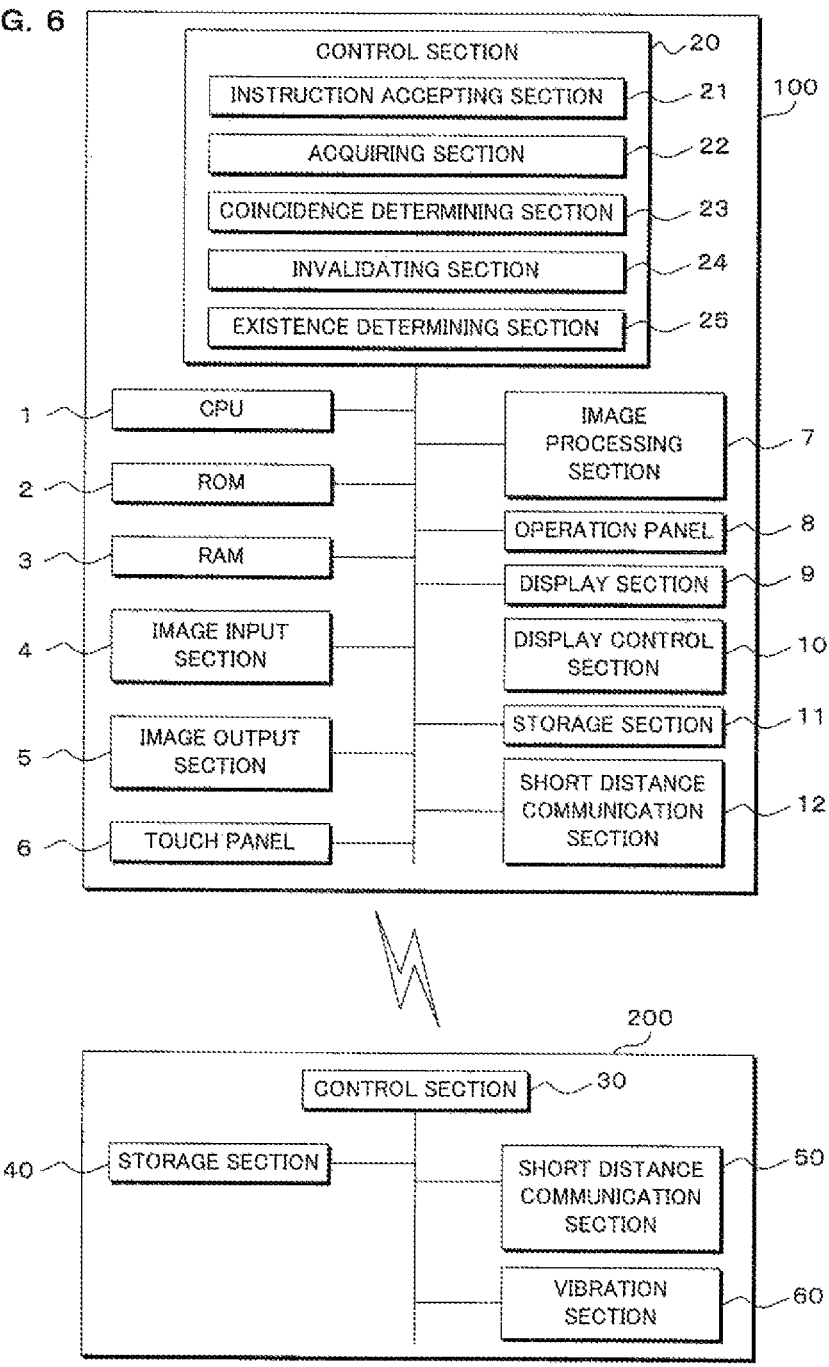
FIG. 6 is a functional block diagram showing an essential configuration of an instruction accepting system according to Embodiment 2 of the present invention.

FIG. 6 is a functional block diagram showing an essential configuration of an instruction accepting system according to Embodiment 2 of the present invention. The instruction accepting system according to Embodiment 2 comprises a digital multi-function peripheral 100 (information processing apparatus), and one or a plurality of memory devices including a memory device 200 (instruction device).

Although configurations of the digital multi-function peripheral 100 and the memory device 200 of Embodiment 2 are the same as those of Embodiment 1, a configuration of a control section 20 of the digital multi-function peripheral 100 is different from that of Embodiment 1.

Similarly to Embodiment 1, the control section 20 includes an instruction accepting section 21, an acquiring section 22, a coincidence determining section 23, an invalidating section 24 and further an existence determining section 25.

The existence determining section 25 determines whether or not a memory device is located within a predetermined range. The existence determining section 25 determines it based on whether or not transmission and reception between the short distance communication section 12 and a short distance communication section of a corresponding memory device are permitted.

For example, when a so-called communication mode of a non-contact method (RFID (Radio Frequency Identification) system) is employed for the short distance communication section 12 of the digital multi-function peripheral 100 and the short distance communication section of the corresponding memory device in Embodiment 2, the existence determining section 25 can determine it based on whether or not transmission and reception are permitted in conformity with the communication mode.

In detail, the short distance communication section 12 of the digital multi-function peripheral 100 functions as a so-called contact/non-contact IC card, the short distance communication section of the corresponding memory device functions as a so-called reader/writer, and they are configured so as to employ a so-called electrostatic coupling method or a so-called electromagnetic coupling method. In this case, the reader/writer (corresponding short distance communication section) always sends an activation signal (electromagnetic wave). When the contact/non-contact IC card (short distance communication section 12) and the reader/writer (corresponding short distance communication section) approach each other to the extent that they can communicate with each other (several millimeters to several centimeters), the contact/non-contact IC card (short distance communication section 12) receives an electromagnetic wave sent from the reader/writer (corresponding short distance communication section). When the contact/non-contact IC card (short distance communication section 12) receives the electromagnetic wave, it rectifies a carrier wave of the electromagnetic wave to generate DC power supply, and thereby an internal circuit thereof is driven. Then, the contact/non-contact IC card (short distance communication section 12) performs amplitude modulation, and sends a reply signal according to the activation signal to the reader/writer (corresponding short distance communication section).

Therefore, the existence determining section 25 can determine whether or not the short distance communication section, i.e., the corresponding memory device is within the predetermined range (several millimeters to several centimeters), by monitoring whether or not the short distance communication section 12 receives the electromagnetic wave or the internal circuit is driven.

When the existence determining section 25 determines that any one of the memory devices is within the predetermined range, the display control section 10 displays an authentication icon S for accepting an instruction of authentication on the display section 9, or displays a file icon F representing a file of image data read by the image input section 4 or a file of data already stored in the storage section 11 with a file name thereof on the display section 9. A user touches any one of the file icon F or the authentication icon S displayed on the display section 9 using the memory device which he/she possesses, in the same manner as Embodiment 1.

The above-mentioned "predetermined range" is not limited to the above description, but can be changed to several centimeters to several meters by changing the method for the RFID system to an electromagnetic induction method or a microwave method, or the like.

For convenience of description, the following description explains, as an example, the case in which the short distance communication section 12 of the digital multi-function peripheral 100 and the short distance communication section 50 of the memory device 200 transmit and receive data with the RFID system using the electrostatic coupling method or the electromagnetic coupling method.

Example 1

Figure 7:
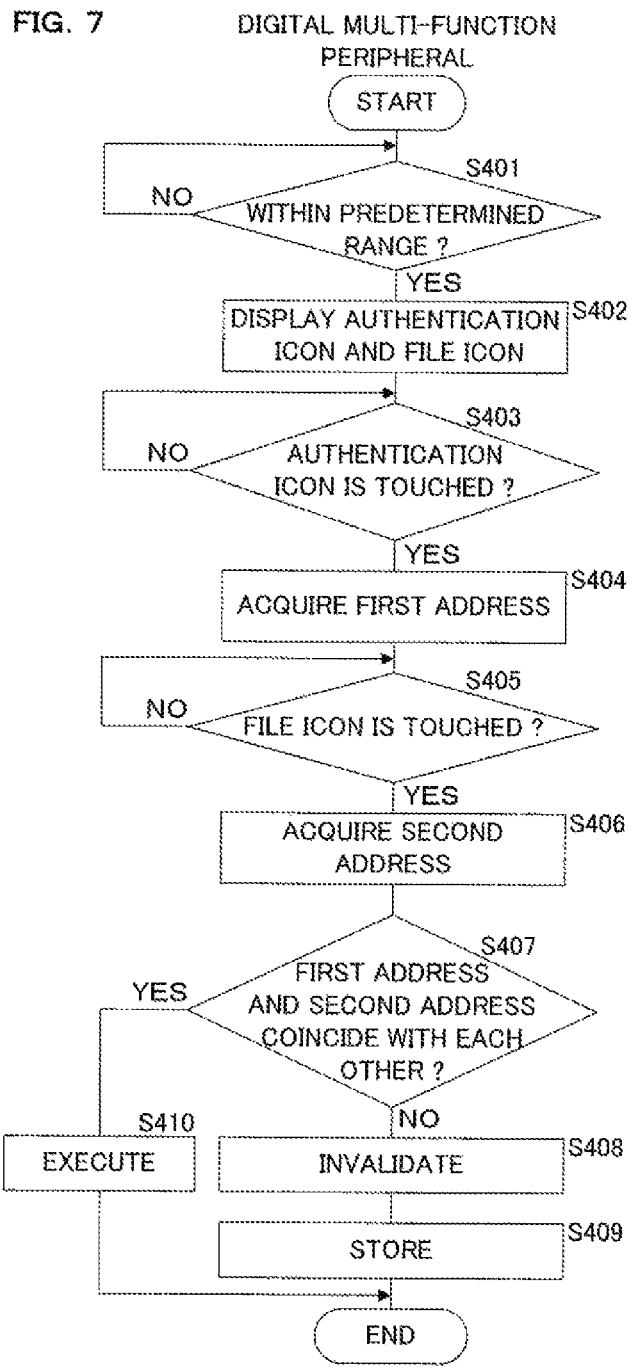
FIG. 7 is a flow chart explaining an instruction acceptance between a digital multi-function peripheral and a memory device in Example 1 of Embodiment 2 of the present invention.

FIG. 7 is a flow chart explaining an instruction acceptance between the digital multi-function peripheral 100 and the memory device 200 in Example 1 of Embodiment 2 of the present invention. For convenience of description, the following description explains, as an example, the case in which the storage section 11 of the digital multi-function peripheral 100 stores a plurality of data files for each file name thereof, and file icons representing the data files stored in the storage section 11 are displayed on the display section 9.

First, the existence determining section 25 of the digital multi-function peripheral 100 determines whether or not any one of the memory devices exists within a predetermined range, with the above-described method (Step S401). In this case, a so-called initial screen is displayed on the display section 9.

When the existence determining section 25 determines that none of the memory devices exists within the predetermined range (Step S401: NO), it repeats the determination until it determines that a memory device exists within the predetermined range.

Figure 8:
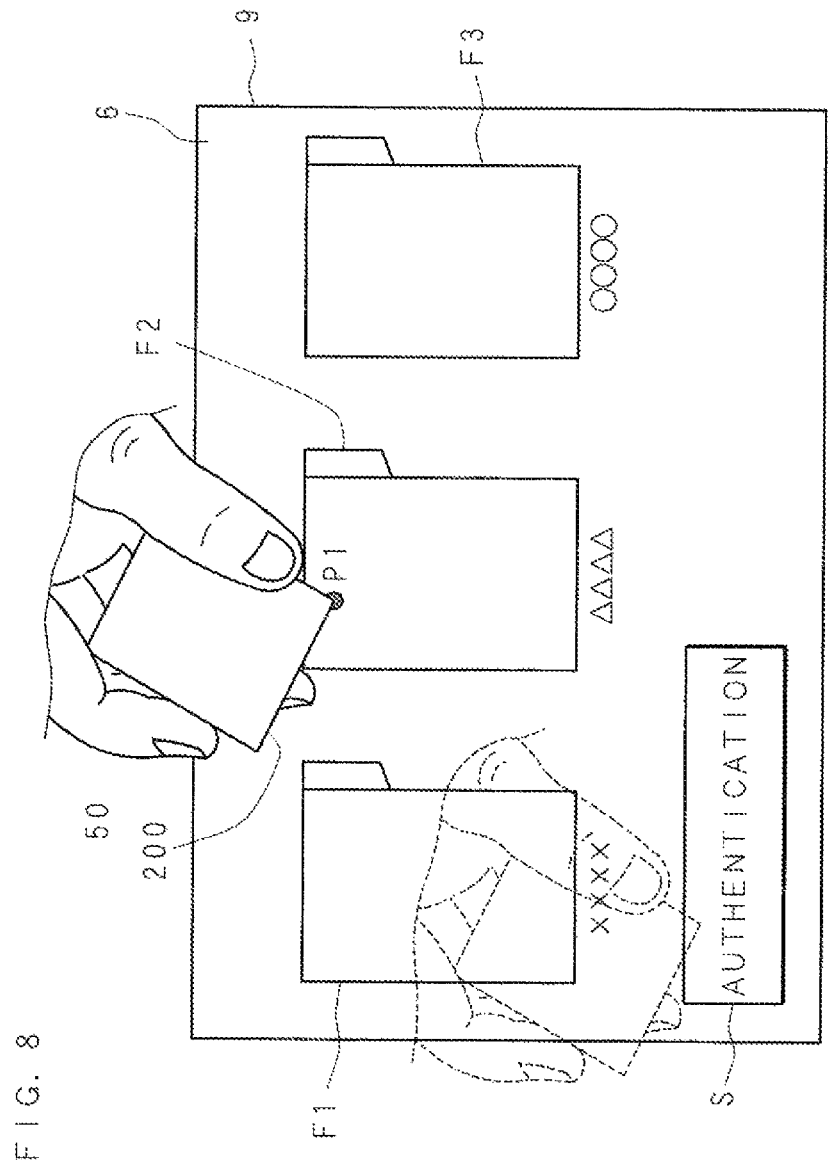
FIG. 8 is an exemplary view showing a display example of file icons and an authentication icon and an example of an operation thereof, in Example 1 of Embodiment 2 of the present invention.

On the other hand, when a user of the memory device 200 who tries such an operation stands in front of the digital multi-function peripheral 100, or when the user moves his/her hand holding the memory device 200 to the operation panel 8 or the display section 9, the existence determining section 25 determines that the predetermined memory device (memory device 200) exists within the predetermined range (Step S401: YES). In this case, the display control section 10 generates a file icon F and an authentication icon S, and displays them on the display section 9 (Step S402). FIG. 8 is an exemplary view showing a display example of file icons F and an authentication icon S and an example of an operation thereof, in Example 1 of Embodiment 2 of the present invention. A plurality of file icons (F1, F2, F3) representing data files stored in the storage section 11 are displayed with file names thereof on the display section 9.

Note that in this case, the short distance communication section 12 receives the electromagnetic wave, an internal circuit thereof is driven and a reply signal is sent to the short distance communication section 50 according to the activation signal, and thereby communication is established between the short distance communication section 12 and the short distance communication section 50.

A user who desires to transmit to a memory device 200 any one of a plurality of data items corresponding to the plurality of file icons F1, F2, F3 displayed on the display section 9, first gives an instruction to authenticate the memory device 200 which he/she possesses, and then touches any one of the file icons F1, F2, F3 displayed on the display section 9 using the memory device 200. That is, the user holds the memory device 200, touches the authentication icon S using a predetermined portion of the memory device 200 to give an instruction to authenticate it, and then touches any one of the file icons F1, F2, F3 to give an instruction to transmit data corresponding to the file icon. In this case, the digital multi-function peripheral 100 (short distance communication section 12) and the memory device 200 (short distance communication section 50) are located in a range that they can communicate with each other.

In this case, the CPU 1 determines whether or not the authentication icon S displayed on the display section 9 is touched, by monitoring the touch panel 6, in other words, based on a signal from the touch panel 6 (Step S403).

When the CPU 1 determines that the authentication icon S displayed on the display section 9 is not touched (Step S403: NO), it repeats the determination until the authentication icon S is touched.

Alternatively, when the CPU1 determines that the authentication icon S displayed on the display section 9 is touched (Step S403: YES), the instruction accepting section 21 accepts a first instruction concerning the authentication icon S.

In this case, the acquiring section 22 acquires a MAC address, i.e., a first address, of a memory device 200 in contact with the authentication icon S from the memory device 200 through the short distance communication section 12, as described above (Step S404). The acquired first address is temporarily stored in the RAM 3.

Note that the present invention is not limited to such a configuration. For example, the CPU 1 may be configured so as to invalidate a touch of the authentication icon S in a case where a user does not perform a touch operation using a memory device or does not hold the memory device, thereby the communication is not established and the first address is not acquired.

Moreover, the CPU 1 may be configured so as to invalidate an acceptance of the second instruction in a case where the second instruction is accepted before the first instruction is accepted.

Subsequently, the CPU 1 determines whether or not any one of the file icons F1, F2, F3 displayed on the display section 9 is touched, by monitoring the touch panel 6, in other words, based on a signal from the touch panel 6 (Step S405).

When the CPU 1 determines that none of the file icons displayed on the display section 9 is touched (Step S405: NO), it repeats the determination until any one of the file icons is touched.

Alternatively, when the user touches any one of the file icons (for example, a point P1 of the file icon F2) using the memory device 200, thereby the CPU 1 determines that the file icon F2 displayed on the display section 9 is touched (Step S405: YES), the instruction accepting section 21 accepts the second instruction concerning the file icon F2.

In this case, the acquiring section 22 acquires a MAC address, i.e., a second address, of a memory device in contact with the file icon F2 from the memory device (Step S406). Since the memory device 200 has contacted the file icon F2, the acquiring section 22 acquires the MAC address of the memory device 200 as a second address through the short distance communication section 12. The acquired second address is temporarily stored in the RAM 3.

Note that the present invention is not limited to such a configuration. For example, the CPU 1 may be configured so as to invalidate a touch of the file icon F2 in a case where a user does not perform a touch operation using a memory device or does not hold the memory device, thereby the communication is not established and the second address is not acquired.

Subsequently, the coincidence determining section 23 determines whether or not the first address and the second address stored in the RAM 3 coincide with each other, by comparing the first address with the second address (Step S407).

When the coincidence determining section 23 determines that the first address and the second address do not coincide with each other (Step S407: NO), the invalidating section 24 invalidates the second instruction accepted by the instruction accepting section 21 (Step S408).

That is, since there is a high risk of an unfair operation by the other person who does not give an instruction to authenticate a memory device when the first address and the second address do not coincide with each other, the invalidating section 24 invalidates the accepted instruction (second instruction) so as to prevent such an unfair operation from occurring.

Moreover, the CPU 1 stores the second address of the memory device acquired at Step S406 in the storage section 11 (Step S409). Thereafter, when the instruction accepting section 21 accepts an instruction by touch of the memory device corresponding to the second address, the invalidating section 24 invalidates the instruction.

Note that the present invention is not limited to such a configuration. For example, the present invention may be configured so as to write data to the effect that an establishment of communication is forbidden to a storage section of a memory device concerning the unfair operation, and refuse establishment of communication between the short distance communication section 12 of the digital multi-function peripheral 100 and a short distance communication section of the memory device. Moreover, the present invention may be configured so as to remove such a refusal of establishment of communication after a predetermined period of time has elapsed.

On the other hand, when the coincidence determining section 23 determines that the first address and the second address coincide with each other (Step S407: YES), the CPU 1 sends data corresponding to the file icon F2 from the storage section 11 to the short distance communication section 12, and gives an instruction for the short distance communication section 12 to transmit it to the memory device 200 corresponding to the first address or the second address. The short distance communication section 12 transmits the data corresponding to the file icon F2 to the short distance communication section 50 of the memory device 200 according to the instruction of the CPU 1, and thereby the second instruction accepted by the instruction accepting section 21 is executed (Step S410).

Note that the present invention is not limited to such a configuration. The present invention may be configured so that, when not a touch operation but a flick operation or a drag operation, for example, is performed by a user, the instruction accepting section 21 accepts such an operation as an instruction to move copy data of the data corresponding to a file icon F2 to the memory device 200, and that the short distance communication section 12 transmits copy data of the data corresponding to the file icon F2 to the short distance communication section 50 of the memory device 200.

Example 2

FIG. 9 is a flow chart explaining an instruction acceptance between the digital multi-function peripheral 100 and the memory device 200 in Example 2 of Embodiment 2 of the present invention. For convenience of description, the following description explains, as an example, the case in which the storage section 11 of the digital multi-function peripheral 100 stores a plurality of data files for each file name thereof, and file icons representing data files stored in the storage section 11 are displayed on the display section 9.

First, the existence determining section 25 of the digital multi-function peripheral 100 determines whether or not any one of the memory devices exists within the predetermined range with the above-described method (Step S501). In this case, a so-called initial screen is displayed on the display section 9.

When the existence determining section 25 determines that none of the memory devices exists within the predetermined range (Step S501: NO), it repeats the determination until it determines that a predetermined memory device exists within the predetermined range.

On the other hand, when a user of a memory device 200 who tries to operate the digital multi-function peripheral 100 stands in front of the digital multi-function peripheral 100, or when the user moves his/her hand holding the memory device 200 to the operation panel 8 or the display section 9, the existence determining section 25 determines that a predetermined memory device (memory device 200) exists within the predetermined range (Step S501: YES). In this case, the display control section 10 generates file icons F1, F2, F3 representing data files stored in the storage section 11 and an authentication icon S, and displays them on the display section 9 (Step S502) (refer to FIG. 8).

Note that in this case, the short distance communication section 12 receives the electromagnetic wave, an internal circuit thereof is driven and a reply signal is sent to the short distance communication section 50 according to the activation signal, and thereby the communication is established between the short distance communication section 12 and the short distance communication section 50.

A user who desires to transmit any one of a plurality of data items corresponding to the plurality of file icons F1, F2, F3 displayed on the display section 9 to the memory device 200, first holds the memory device 200, touches the authentication icon S using a predetermined portion of the memory device 200 to give an instruction to authenticate the memory device 200 which he/she possesses, and then touches any one of the file icons F1, F2, F3 displayed on the display section 9 using the memory device 200 to give an instruction to transmit data corresponding to the file icon.

In this case, the digital multi-function peripheral 100 (short distance communication section 12) and the memory device 200 (short distance communication section 50) are located in a range that they can communicate with each other.

In this case, the CPU 1 determines whether or not the authentication icon S displayed on the display section 9 is touched, by monitoring the touch panel 6, in other words, based on a signal from the touch panel 6 (Step S503). When the CPU 1 determines that the authentication icon S is not touched (Step S503: NO), it repeats the determination until the authentication icon S is touched.

Alternatively, when the CPU 1 determines that the authentication icon S is touched (Step S503: YES), the instruction accepting section 21 accepts the first instruction concerning the authentication icon S.

In this case, the acquiring section 22 acquires a MAC address, i.e., of a memory device 200 in contact with the authentication icon S a first address, from the memory device 200 through the short distance communication section 12, as described above (Step S504). The acquired first address is temporarily stored in the RAM 3.

Subsequently, the CPU 1 determines whether or not any one of the file icons F1, F2, F3 displayed on the display section 9 is touched, by monitoring the touch panel 6, in other words, based on a signal from the touch panel 6 (Step S505). When the CPU 1 determines that none of the file icons is touched (Step S505: NO), it repeats the determination until any one of the file icons is touched.

Alternatively, when a user touches any one of the file icons (for example, file icon F2) using the memory device 200 and thereby the CPU 1 determines that the file icon F2 is touched (Step S505: YES), the instruction accepting section 21 accepts the second instruction concerning the file icon F2.

In this case, the acquiring section 22 acquires a MAC address, i.e., a second address, of a memory device in contact with the file icon F2 from the memory device (Step S506). Since the memory device 200 has contacted the file icon F2, the acquiring section 22 acquires the MAC address of the memory device 200 as the second address through the short distance communication section 12. The acquired second address is temporarily stored in the RAM 3.

Subsequently, the coincidence determining section 23 determines whether or not the first address and the second address stored in the RAM 3 coincide with each other, by comparing the first address with the second address (Step S507).

When the coincidence determining section 23 determines that the first address and the second address do not coincide with each other (Step S507: NO), the invalidating section 24 invalidates the second instruction accepted by the instruction accepting section 21 (Step S508).

Moreover, the CPU 1 generates data (difference data) to the effect that the memory device corresponding to the first address and the memory device corresponding to the second address are different from each other, sends it to the short distance communication section 12, and gives an instruction to transmit it to the memory device 200. According to the instruction of the CPU 1, the short distance communication section 12 transmits the difference data to the memory device 200 corresponding to the first address (Step S509).

In this case, the short distance communication section 50 of the memory device 200 receives the difference data (Step S601). Also, the control section 30 causes the vibration section 60 to vibrate at a predetermined pattern, and to report to a user that the memory device corresponding to the first address and the memory device corresponding to the second address are different from each other, in other words, such an operation is performed by the other person (Step S602).

In the above description, although the case in which the vibration section 60 reports to the user using the vibration is explained as an example, it is not limited to this. For example, the present invention may be configured so as to provide an LED, and report by varying a luminescent pattern or a luminescent color.

On the other hand, when the coincidence determining section 23 determines that the first address and the second address coincide with each other (Step S507: YES), The CPU 1 sends data corresponding to the file icon F2 from the storage section 11 to the short distance communication section 12, and gives an instruction to transmit it to the memory device 200 corresponding to the first address or the second address. According to the instruction of the CPU 1, the short distance communication section 12 transmits data corresponding to the file icon F2 to the short distance communication section 50 of the memory device 200, and thereby the second instruction accepted by the instruction accepting section 21 is executed (Step S510).

The same parts as in Embodiment 1 are designated with the same reference numbers, and detailed description thereof will be omitted.

Embodiment 3

FIG. 10 is a functional block diagram showing an essential configuration of a digital multi-function peripheral 100 according to Embodiment 3 of the present invention. The digital multi-function peripheral 100 according to Embodiment 3 is configured so that a computer program for operations is capable of being provided by a removable recording medium A, such as a CD-ROM, through an I/F section 13. Moreover, the digital multi-function peripheral 100 according to Embodiment 3 is configured so that the computer program is capable of being downloaded from an external device through the short distance communication section 12. The contents will be explained below.

The digital multi-function peripheral 100 according to Embodiment 3 comprises an external (or internal) recording medium reader device (not shown). A removable recording medium A, which stores a program for accepting a first instruction concerning authentication and a second instruction concerning processing of data based on a contact position of a memory device (external device) and a display surface of the display section 9; acquiring a first address (first identification data) stored in a memory device (external device) concerning the first instruction and a second address (second identification data) stored in a memory device (external device) concerning the second instruction; and when the first address (first identification data) and the second address (second identification data) do not coincide with each other, invalidating the accepted second instruction, is inserted into the recording medium reader device, and, for example, a CPU 1 installs the program in a ROM 2. The program is loaded in a RAM 3 and executed. Consequently, it functions as the digital multi-function peripheral 100 in Embodiment 1 and Embodiment 2.

The recording medium may be a so-called program medium, or a medium carrying program codes in a fixed manner, such as tapes including a magnetic tape and a cassette tape, disks including magnetic disks such as a flexible disk and a hard disk, and optical disks, such as a CD-ROM, an MO, an MD, and a DVD, cards such as an IC card (including a memory card) and an optical card, or a semiconductor memory such as a mask ROM, an EPROM, and an EEPROM, and a flash ROM.

Or the recording medium may be a medium carrying program codes in a flowing manner like downloading the program codes from a network through the short distance communication section 12. In the case where the program is downloaded from a communication network in such a manner, a program for downloading is stored in the main apparatus in advance, or installed from a different recording medium. Note that the present invention can be also implemented in the form of a computer data signal embedded in a carrier wave in which the program codes are embodied by an electronic transfer.

The same parts as in Embodiment 1 are designated with the same reference numbers, and detailed explanations thereof will be omitted.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

What is claimed is:

1. An instruction accepting system comprising an information processing apparatus for processing data, and one or a plurality of instruction devices for giving an instruction for processing data to the information processing apparatus, wherein
the one or the plurality of instruction devices comprises a storage section for storing identification data of the one or the plurality of instruction devices,
the information processing apparatus comprises:
a display section including a display surface for contacting the one or the plurality of instruction devices;
an instruction accepting section for accepting a first instruction concerning authentication and a second instruction concerning processing of the data, based on a contact position of the one or the plurality of instruction devices and the display surface of the display section;
an acquiring section for acquiring first identification data stored in the one or the plurality of instruction devices concerning the first instruction, and second identification data stored in the one or the plurality of instruction devices concerning the second instruction; and
an invalidating section for invalidating the second instruction accepted by the instruction accepting section when the first identification data and the second identification data do not coincide with each other.

2. The instruction accepting system according to claim 1, wherein
the information processing apparatus further comprises an existence determining section for determining whether or not the one or the plurality of instruction devices is in a predetermined range,
when the existence determining section determines that the one or the plurality of instruction devices is in the predetermined range, the display section displays images concerning the first instruction and the second instruction, respectively, and
the instruction accepting section accepts the first instruction or the second instruction based on contact of the one or the plurality of instruction devices and the image.

3. An information processing apparatus for accepting an instruction concerning processing of data from one or a plurality of external devices storing identification data of the one or the plurality of external devices, and processing the data, comprising:
a display section including a display surface for contacting the one or the plurality of external devices;
an instruction accepting section for accepting a first instruction concerning authentication and a second instruction concerning processing of the data, based on a contact position of the one or the plurality of external devices and the display surface of the display section;

an acquiring section for acquiring first identification data stored in the one or the plurality of external devices concerning the first instruction, and second identification data stored in the one or the plurality of external devices concerning the second instruction; and an invalidating section for invalidating the second instruction accepted by the instruction accepting section when the first identification data and the second identification data do not coincide with each other.

4. An instruction accepting method using an information processing apparatus comprising a display section including a display surface for contacting one or a plurality of external devices storing identification data of the one or plurality of external device, the information processing apparatus for accepting an instruction concerning processing of data from the one or plurality of external device and processing the data comprising:

an instruction accepting step of accepting a first instruction concerning authentication and a second instruction concerning processing of the data, based on a contact position of the one or plurality of external device and the display surface of the display section;

a step of acquiring first identification data stored in the one or plurality of external device concerning the first instruction, and second identification data stored in the one or plurality of external device concerning the second instruction; and a step of invalidating the second instruction accepted at the instruction accepting step when the first identification data and the second identification data do not coincide with each other.

* * * * *